(12) United States Patent
Nishikawa et al.

(10) Patent No.: US 7,847,877 B2
(45) Date of Patent: Dec. 7, 2010

(54) PANEL

(75) Inventors: Kazuhiro Nishikawa, Kyoto (JP);
Takeshi Asakura, Kyoto (JP); Yoshihiro Kai, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 737 days.

(21) Appl. No.: 11/887,160

(22) PCT Filed: Nov. 7, 2006

(86) PCT No.: PCT/JP2006/322154

§ 371 (c)(1),
(2), (4) Date: Sep. 26, 2007

(87) PCT Pub. No.: WO2007/055189

PCT Pub. Date: May 18, 2007

(65) Prior Publication Data

US 2009/0033824 A1    Feb. 5, 2009

(30) Foreign Application Priority Data

Nov. 8, 2005    (JP) .............................. 2005-323479

(51) Int. Cl.
*G02F 1/1335* (2006.01)
(52) U.S. Cl. .............................. 349/58; 349/56; 349/96
(58) Field of Classification Search .................. 349/58, 349/56, 96, 104, 98, 102, 122, 138

See application file for complete search history.

(56) References Cited

U.S. PATENT DOCUMENTS 6,611,299 B1    8/2003    Fujii et al.
(Continued)

FOREIGN PATENT DOCUMENTS

JP    2000-39611    2/2000
(Continued)

OTHER PUBLICATIONS

International Search Report (in English language) of Jan. 16, 2007 issued in International Application No. PCT/JP2006/322154.
(Continued)

*Primary Examiner*—Brian M Healy
(74) *Attorney, Agent, or Firm*—Wenderoth, Lind & Ponack, L.L.P.

(57) ABSTRACT

A design panel attached to a casing for an electronic equipment, which is constructed so that a display device whose display surface goes black at standby is placeable inside the casing, and which is formed with an opening that makes the display surface visible, the design panel being attached to the casing so as to cover the opening, the design panel including, a transparent support substrate having a larger area than the opening, a polarizing film provided outside or inside the transparent support substrate, a ¼ wavelength phase difference film provided on a closer side to an attachment side of the casing with respect to the polarizing film, and a black colored section provided on the closer side to the attachment side of the casing with respect to the transparent support substrate, for blacking a portion which is able to be in contact with the casing, wherein the display device is made visible from the outside at information display, whereas the display device is covered so as to be made invisible from the outside at standby.

10 Claims, 12 Drawing Sheets

U.S. PATENT DOCUMENTS

| | | | |
|---|---|---|---|
| 6,977,700 B2 * | 12/2005 | Uesaka et al. | 349/114 |
| 7,695,782 B2 * | 4/2010 | Takeko et al. | 428/1.5 |
| 2008/0036946 A1 * | 2/2008 | Ono et al. | 349/96 |
| 2008/0218666 A1 * | 9/2008 | Toyooka | 349/96 |
| 2009/0033824 A1 * | 2/2009 | Nishikawa et al. | 349/58 |

FOREIGN PATENT DOCUMENTS

| | | |
|---|---|---|
| JP | 2000-111896 | 4/2000 |
| JP | 2001-222230 | 8/2001 |
| JP | 2003-255847 | 9/2003 |

OTHER PUBLICATIONS

International Preliminary Report on Patentability issued May 22, 2008 in the International (PCT) Application PCT/JP2006/322154.

* cited by examiner

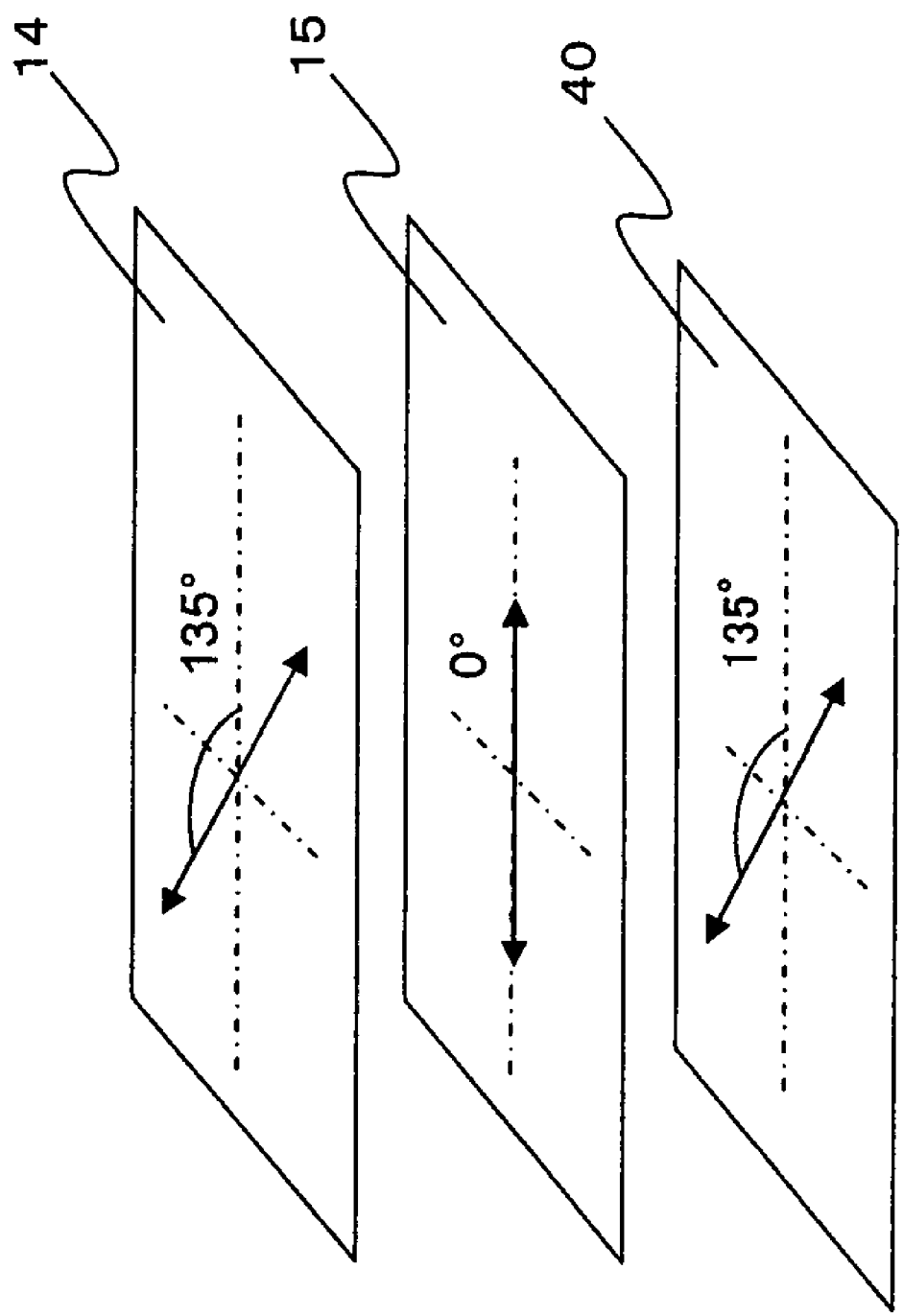

PANEL

TECHNICAL FIELD

The present invention relates to a design panel to be used for electronic equipment equipped with a display device, such as mobile phones and smart phones.

BACKGROUND ART

A conventional electronic equipment incorporating a display device therein has an opening to make a display surface of the display device visible from its exterior, and the opening is entirely covered with a transparent panel, such as a glass panel or a plastic panel, externally attached to the electronic equipment.

DISCLOSURE OF THE INVENTION

Issue to be Solved by the Invention

The conventional electronic equipment having such a structure described above has a transparent panel, and therefore when viewed through the transparent panel, the display surface of the display device can be easily distinguished from a frame portion surrounding the opening formed in a casing for the electronic equipment supporting the transparent panel. In recent years, a user demand for the electronic equipments having an improved design is growing day by day. From the viewpoint of improving the design of the electronic equipment, concealing the display surface of the display device, that is, making the display surface indistinguishable from the frame portion at a glance not when information such as text or graphics is displayed on the display surface of the display device is greatly effective.

As a first possible method for concealing the display surface of the display device, replacement of the transparent panel with, for example, a blackish smoked panel having a low transmittance can be considered. According to the first possible method, it is possible to make the display surface of the display device indistinguishable from the frame portion when the display device is in a standby state (that is, when information is not displayed on the display surface), but due to an extremely low transmittance of the smoked panel, there is an issue that the display surface gets dark and therefore hard to see when information is displayed on the display surface of the display device.

As a second possible method for concealing the display surface of the display device, attachment of a special film (e.g., a light control film manufactured by 3M company) for narrowing a viewing angle (e.g., so that the display surface is visible only from the front of the display surface) onto the transparent panel can be considered. According to the second possible method, it is possible to make the display surface of the display device indistinguishable from the frame portion at a glance when the display surface of the display device being in the standby state is viewed from angles other than the front of the display surface. However, in this case, it is obvious that the display surface of the display device can be easily distinguished from the frame portion when the display surface is viewed from the front thereof, and therefore the above object of obtaining electronic equipments having an improved design cannot be fully achieved. Further, the transparent panel having such a special film attached thereto has a lower transmittance than the transparent panel used alone, which causes an issue that the display surface of the display device gets dark and therefore hard to see when information is displayed on the display surface. Furthermore, as described above, since visual images on the display surface are hard to see from angles other than the front of the display surface, a user needs to always face the front of the display surface of the display device to see the display surface, which makes it hard to use the electronic equipment.

In order to solve the above issues, it is an object of the present invention to provide a design panel through which a display surface of a display device is visible from an exterior thereof when information is displayed on the display surface but is invisible when the display device is in a standby state.

Means for Improving the Issues

In order to achieve the above object, the present invention has the following constitution.

According to a first aspect of the present invention, there is provided a design panel attached to a casing for an electronic equipment, which is constructed so that a display device whose display surface goes black at standby is placeable inside the casing, and which is formed with an opening that makes the display surface of the display device visible from an outside thereof, the design panel being attached to the casing from the outside for entirely covering the opening, the design panel comprising:

a transparent support substrate which is able to externally attach to the opening and has a larger area than the opening;

a polarizing film provided outside or inside of the transparent support substrate to convert incident light into a linearly polarized light;

a ¼ wavelength phase difference film provided on a closer side to an attachment side of the casing with respect to the polarizing film to convert the linearly polarized light into a circularly polarized light; and a black-colored section provided on the closer side to the attachment side of the casing with respect to the transparent support substrate, for blacking a portion which is able to be in contact with the casing, wherein the polarizing film and the ¼ wavelength phase difference film provide a concealing section, and wherein the display device is made visible from the outside through the concealing section at information display, whereas the display device is made invisible from the outside through the concealing section at standby.

The term "inside" of the transparent support substrate herein refers to a side opposed to the display device provided in the casing when the design panel is attached to the casing, and the term "outside" of the transparent support substrate herein refers to an opposite side of the "inside", that is, a side facing the exterior of the casing when the design panel is attached to the casing.

The phrase "portion which is able to be in contact with" refers to a portion which comes into contact with the casing when the design panel is attached to the casing, but the portion does not include a portion which comes into contact with the opening of the casing.

According to a second aspect of the present invention, there is provided the design panel as defined in the first aspect, wherein in a case where the display device is a liquid crystal display device having a polarizing plate, the polarizing film is placeable to have an absorption axis that is the same as that of the polarizing plate.

According to a third aspect of the present invention, there is provided the design panel as defined in the first or second aspects, wherein the polarizing film is provided to be adjacent to an inside surface of the transparent support substrate.

According to a fourth aspect of the present invention, there is provided the design panel as defined in the first or second aspects, wherein the black-colored section is provided on the closer side to the attachment side of the casing with respect to the polarizing film.

According to a fifth aspect of the present invention, there is provided the design panel as defined in the fourth aspect, wherein the black-colored section is a layer printed on the ¼ wavelength phase difference film.

According to a sixth aspect of the present invention, there is provided the design panel as defined in the fourth aspect, wherein the black-colored section comprises a black double-sided pressure-sensitive adhesive tape with which the transparent support substrate or the ¼ wavelength phase difference film adjacent to an outside surface of the black-colored section, and the casing are able to be adhered together.

According to a seventh aspect of the present invention, there is provided the design panel as defined in the third aspect, wherein the black-colored section comprises a film member provided to be adjacent to an outside surface or an inside surface of the ¼ wavelength phase difference film.

According to an eighth aspect of the present invention, there is provided the design panel as defined in the first or second aspects, whose outermost surface is able to be flush with an outer surface of the casing where the opening is formed.

The phrase "be flush with" herein means that the design panel is attached to the outer surface of the casing where the opening is formed without any difference in height between the surface of the design panel and the outer surface of the casing.

According to a ninth aspect of the present invention, there is provided the design panel as defined in the first or second aspects, wherein the concealing section further comprises a ½ wavelength phase difference film provided between the polarizing film and the ¼ wavelength phase difference film.

According to a tenth aspect of the present invention, there is provided the design panel as defined in the first or second aspects, wherein the polarizing film is provided to be adjacent to the inside surface of the transparent support substrate, and wherein the concealing section further comprises a ½ wavelength phase difference film provided between the polarizing film and the ¼ wavelength phase difference film.

EFFECTS OF THE INVENTION

In accordance with the present invention has the black-colored section which is to be arranged at a position corresponding to the frame portion surrounding the opening of the casing for an electronic equipment supporting the design panel, and the concealing section which is to be arranged at a position corresponding to the opening, when the display device is in the standby state, the display surface of the display device and the frame portion look like one unit when viewed through the design panel, that is, they cannot be visually distinguished from each other. Therefore, a user (an observer) cannot visually recognize the display device from the exterior of the design panel, and the display panel looks like a black window to the user. That is, the design panel can conceal the presence of the display device when the display device is in the standby state because the design panel looks like a solid black window. On the other hand, when information is displayed on the display surface of the display device, the display device becomes visible from the exterior of the casing for the electronic equipment, and therefore the user feels that visual images pop up on the display surface of the display device, which is effective from the viewpoint of improving the design of the electronic equipment.

Further, when the polarizing film of the concealing section is arranged so as to have the absorption axis that is the same as that of the polarizing plate of the liquid crystal display device, it is possible to pass a larger amount of light emitted from the light source of the display device through the design panel when information is displayed on the display surface of the display device, thereby improving the design of the electronic equipment.

Further, when the polarizing film is provided so as to be adjacent to the inside surface of the transparent support substrate, the transparent support substrate is located on the outermost side of the design panel, and therefore the design panel can have a surface having high smoothness and scratch resistance. In addition, it is possible to prevent the formation of a step resulting from the polarizing film and therefore to eliminate the fear of separation of the polarizing film from the design panel.

Further, when the black-colored section is provided on a closer side to an attachment side of the casing with respect to the polarizing film, the black-colored section is more likely to be similar in color to the display device in the standby state having the black display surface. Therefore, it is difficult to discern a boundary between the display device and the design panel, thereby improving the design of the electronic equipment.

Further, when the black-colored section is printed on the ¼ wavelength phase difference film, it is possible to reduce the thickness of the black-colored section and therefore to reduce the thickness of the entire design panel.

Further, when the black-colored section comprises the black double-sided pressure-sensitive adhesive tape, it is possible to eliminate the necessity to separately provide a step of forming a black-colored section and therefore to reduce costs and improve productivity.

Further, when the black-colored section is provided so as to be adjacent to the outside surface or the inside surface of the ¼ wavelength phase difference film, the black-colored section is more likely to be similar in color to the display device in the standby state having the black display surface. Therefore, it is difficult to discern the boundary between the display device and the design panel, thereby improving the design of the electronic equipment.

Further, when the outermost surface of the design panel is made flush with the outer surface of the casing where the opening is formed, the design panel and the casing are more likely to look like one unit, which makes it possible to further improve the design of the electronic equipment and makes it hard to separate the design panel from the casing.

Further, when the concealing section further includes the ½ wavelength phase difference film interposed between the polarizing film and the ¼ wavelength phase difference film, it is possible to suppress the leakage not only of light having a wavelength around 550 nm, at which human visibility is highest, but also of light having a short wavelength around 400 nm and light having a long wavelength around 750 nm from the interior to the exterior of the electronic equipment, thereby further improving the design of the electronic equipment.

BRIEF DESCRIPTION OF THE DRAWINGS

These and other aspects and features of the present invention will become clear from the following description taken in conjunction with the preferred embodiments thereof with reference to the accompanying drawings, in which:

FIG. 10A is an exploded perspective view which schematically shows the positional relationship of polarization directions between a polarizing plate and a ¼ wavelength phase difference film of the design panel according to the first embodiment of the present invention and an upper polarizing plate of a display device;

BEST MODE FOR CARRYING OUT THE INVENTION

Figure 1A:
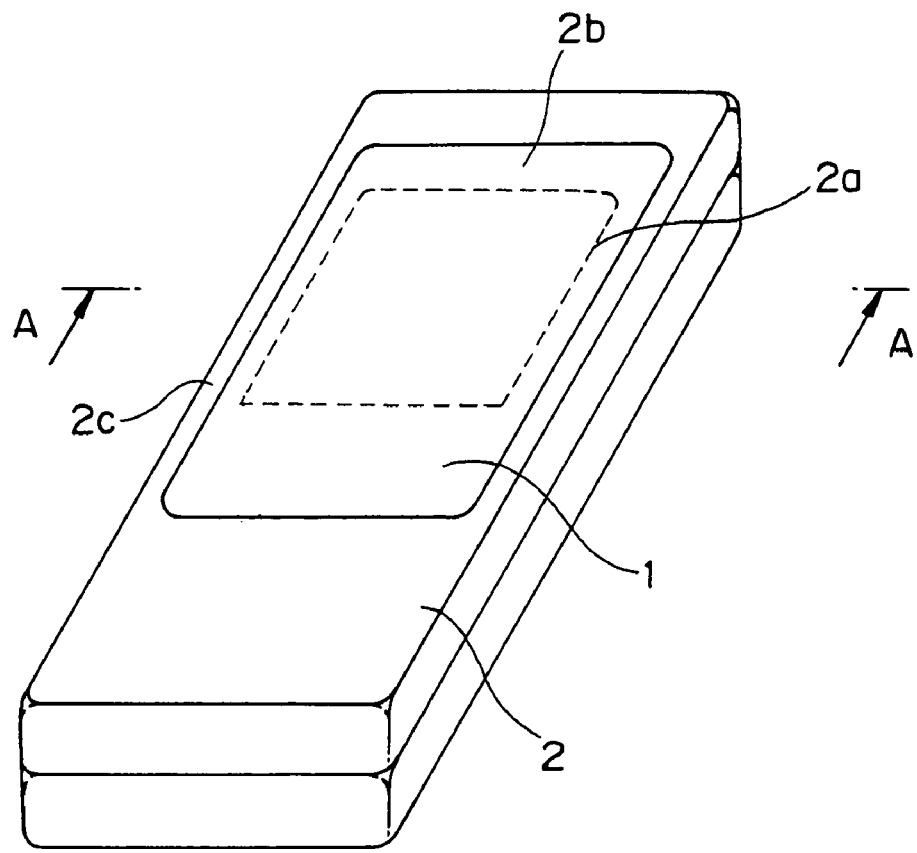
FIG. 1A is a perspective view which shows the basic structure of a mobile phone using a design panel according to a first embodiment of the present invention.

Before the description of the present invention proceeds, it is to be noted that like components are designated by like reference numerals throughout the accompanying drawings.

First Embodiment

Figure 1B:
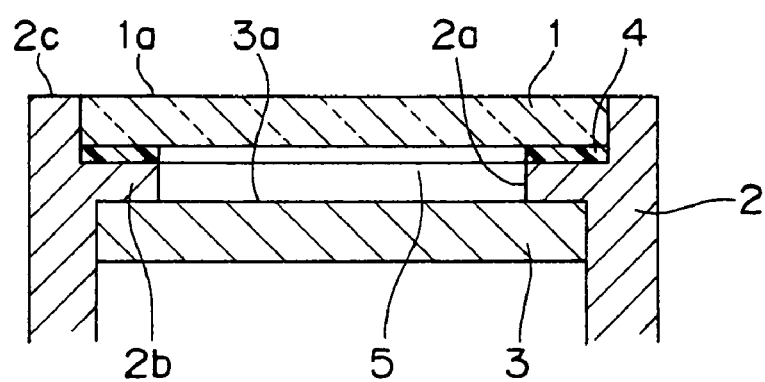
FIG. 1B is a schematic view which shows the cross section A-A of the mobile phone shown in FIG. 1A.

FIG. 1A is a perspective view which shows a basic structure of a mobile phone using a design panel 1 according to a first embodiment of the present invention, and FIG. 1B is a schematic view which shows the cross section A-A of the mobile phone shown in FIG. 1A.

The design panel 1 (which is a diagonally shaded area in FIG. 1B) is externally attached to a casing 2 made of metal such as aluminum or resin with a double-sided pressure-sensitive adhesive tape 4 to cover an opening 2a partially formed in the surface of the casing 2, and is supported by a frame portion 2b surrounding the opening 2a. The opening 2a of the casing 2 is formed so that a display surface 3a of a display device 3 provided in the casing 2 is visible from the exterior of the casing 2. The design panel 1 has a larger area than the opening 2a, and is arranged so as to be opposed to the display surface 3a of the display device 3 with an air layer 5 being interposed therebetween. An upper (outer) surface 2c of the casing 2 where the opening 2a is formed is flush with an upper surface 1a of the design panel 1. Specifically, the opening 2a and the frame portion 2b provide a hollow portion in the upper surface 2c of the casing 2 where the opening 2a is formed, and the design panel 1 is fitted into the hollow portion. This makes it possible to improve the design of the electronic equipment, and makes it hard to separate the design panel 1 from the casing 2.

The display device 3 is a liquid crystal display whose a display surface 3a goes black at standby, that is, when information such as text or graphics is not displayed on the display surface 3a. For example, in a case where the display device 3 is used for a mobile phone, the display surface 3a goes entirely black when the mobile phone is not used. This state is a "standby" state. Such a liquid crystal display can be realized by using, for example, a normally black liquid crystal display (which is designed so as to have a minimum transmittance or reflectivity (that is, so as to have a black display surface) when no voltage is applied thereto but have an increased transmittance when a voltage is applied thereto). In this case, a voltage is not applied to the liquid crystal display in the standby state. Alternatively, such a liquid crystal display may be realized by using, for example, a normally white liquid crystal display (which is designed so as to have a maximum transmittance or reflectivity (that is, so as to have a white display surface) when no voltage is applied thereto but have a decreased transmittance when a voltage is applied thereto). In this case, a weak voltage is applied to the liquid crystal display in the standby state.

In this regard, it is to be noted that in a case where a normally black liquid crystal display is used as the display device 3, there is an advantage that waste of power consumption can be eliminated because a normally black liquid crystal display has a black display surface when no voltage is applied thereto. On the other hand, in a case where a normally white liquid crystal display is used as the display device 3, it is possible to further improve the design because a normally white liquid crystal display has better black contrast than a normally black liquid crystal display.

Figure 2:
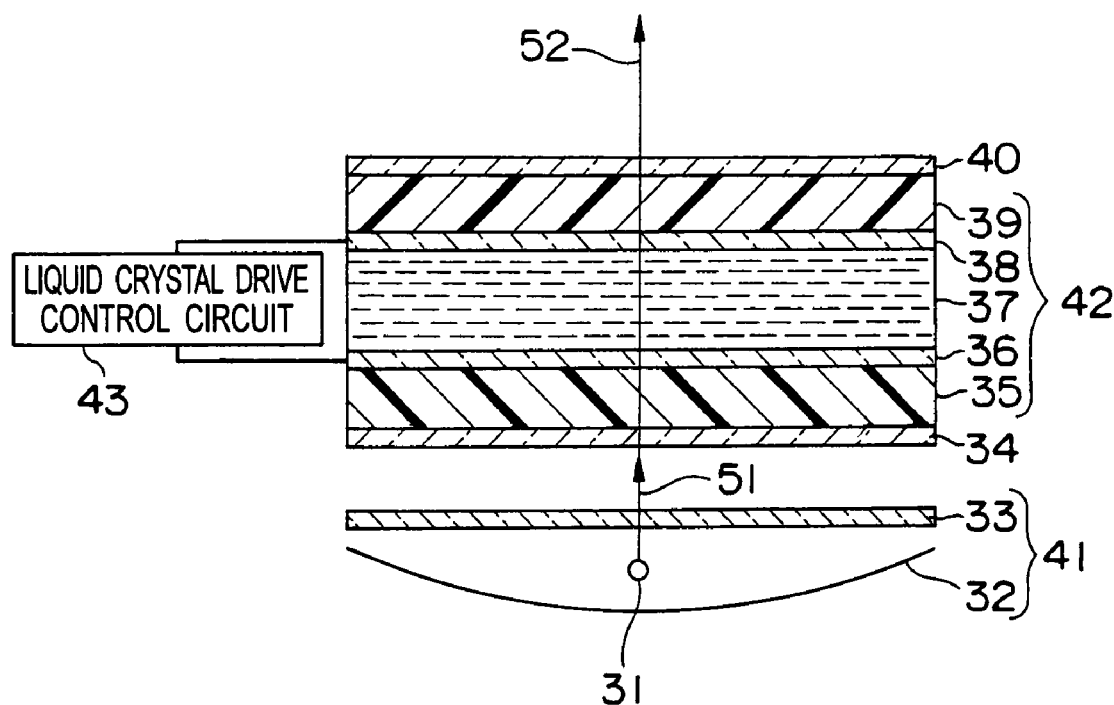
FIG. 2 is a cross-sectional view which shows the structure of a liquid crystal display.

FIG. 2 is a cross-sectional view which specifically shows the structure of the display device 3. As shown in FIG. 2, the display device 3 includes an illumination section 41 having a light source 31, a reflector 32, and a diffuser plate 33, a liquid crystal cell section 42 having two substrates 35 and 39, between which a liquid crystal 37 interposed between transparent electrode films 36 and 38 is provided, a lower polarizing plate 34 and an upper polarizing plate 40 which are provided so as to sandwich the liquid crystal cell section 42 therebetween, and a liquid crystal drive control circuit 43 for controlling a voltage to be applied to the liquid crystal 37.

Light emitted from the light source 31 is partially reflected off the reflector 32, and is then diffused by the diffuser plate 33 to provide illumination light 51 having a uniform illumination distribution. The illumination light 51 illuminates the liquid crystal cell section 42 entirely. The lower polarizing plate 34 transmits only a specific polarization component of the illumination light 51 to convert the illumination light into a linearly polarized light. As the liquid crystal 37, for example, a twisted nematic (TN) liquid crystal is used. Although not shown in the figure, the interface between the transparent electrode film 36 and the liquid crystal 37 and the interface between the transparent electrode film 38 and the liquid crystal 37 have been subjected to treatment for light distribution. The liquid crystal 37 has the function of rotating the linearly polarized light, and the optical activity of the liquid crystal 37 is changed according to a voltage applied thereto, and therefore the amount of output light 52 can be controlled by the upper polarizing plate 40. The display device 3 can have the ability to display visual images by controlling a voltage to be applied to the liquid crystal 37 using the liquid crystal drive control circuit 43.

Figure 3A:
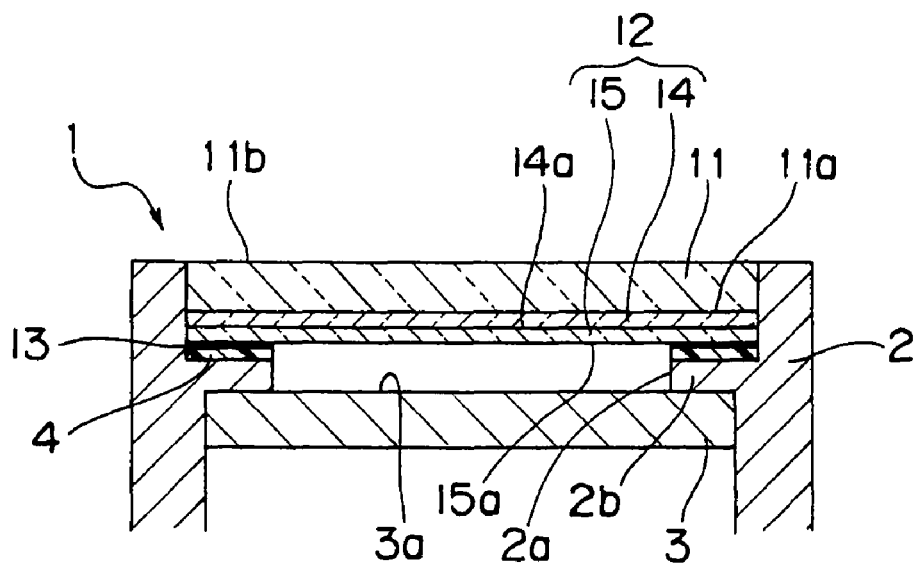
FIG. 3A is a partially enlarged cross-sectional view of the mobile phone using a design panel according to the first embodiment of the present invention.
Figure 3B:
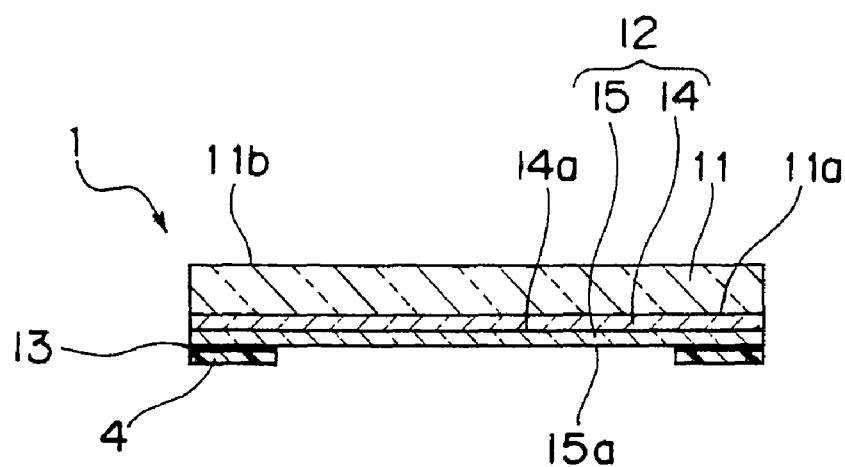
FIG. 3B is a cross-sectional view which shows the structure of the design panel according to the first embodiment of the present invention.

FIG. 3A is a partially enlarged cross-sectional view of the mobile phone using the design panel 1 according to the first embodiment of the present invention, and FIG. 3B is a cross-sectional view which shows the structure of the design panel 1 according to the first embodiment of the present invention. The design panel 1 includes a transparent support substrate 11, a concealing section 12 provided on an entire lower surface 11a of the transparent support substrate 11, and a black-colored section 13 provided on the lower surface of the concealing section 12 so as to fit the shape of the frame portion 2b surrounding the opening 2a of the casing 2.

The transparent support substrate 11 is formed from a transparent member such as a glass panel or a plastic panel. Examples of a glass material for forming the transparent support substrate 11 include soda glass generally having excellent transparency and physically or chemically strengthened glass having enhanced strength. Particularly, strengthened glass is preferably used for forming a design panel to be used for mobile electronic equipments such as mobile phones from the viewpoint of handleability. Examples of a specific method for strengthening glass include a physical strengthening method and a chemical strengthening method. The physical strengthening method utilizes quenching principles to cause difference in temperature between the surface and interior of glass by rapidly quenching to allow the glass to have compressive stress. The chemical strengthening method allows glass to have compressive stress by immersing glass in a potassium nitrate solution to replace sodium ions contained in the surface of the glass with potassium ions contained in the solution so that both ions having different ionic radii can exist in the surface and interior of the glass. Generally, the design panel 1 according to the first embodiment of the present invention is preferably formed by the chemical strengthening method because a thin glass sheet is often used from the viewpoint of a technical trend toward thinner devices.

As a plastic material for forming the transparent support substrate 11, one having excellent mechanical strength, heat resistance, and chemical resistance is preferably used. Examples of a transparent resin satisfying such a requirement include polyacrylmethacrylate (PMMA), polycarbonate (PC), polystyrene, polyarylate, "ARTON" (which is a norbornene-based resin manufactured by JSR Corporation), and "ZEONOR" (manufactured by ZEON Corporation).

As shown in FIG. 10A, the concealing section 12 includes a polarizing film 14 having an absorption axis that is the same as that of the upper polarizing plate 40 of the display device 3 to convert incident light into linearly polarized light, and a ¼ wavelength phase difference film 15 arranged on the inside of the polarizing film 14 so that the optic axis thereof forms an angle of 45° or 135° (in FIG. 10A, 135°) with the absorption axis of the polarizing film 14 to give a phase delay of ¼ wavelength to convert the linearly polarized light into circularly polarized light.

As shown in FIGS. 3A and 3B, the concealing section 12 preferably has a structure in which the polarizing film 14 is attached to the entire lower surface 11a of the transparent support substrate 11 and the ¼ wavelength phase difference film 15 is attached to an entire lower surface 14a of the polarizing film 14. Such a structure makes it possible to arrange the transparent support substrate 11 on the outermost side of the design panel 1, thereby enabling an outside surface 11b of the transparent support substrate 11 to be subjected to hard coat treatment. The hard coat treatment is preferably carried out by coating the outside surface 11b with an acrylic or siloxane-based resin layer having a thickness of about 1 to 10 μm by dipping, roll coating, or spraying.

Figure 4:
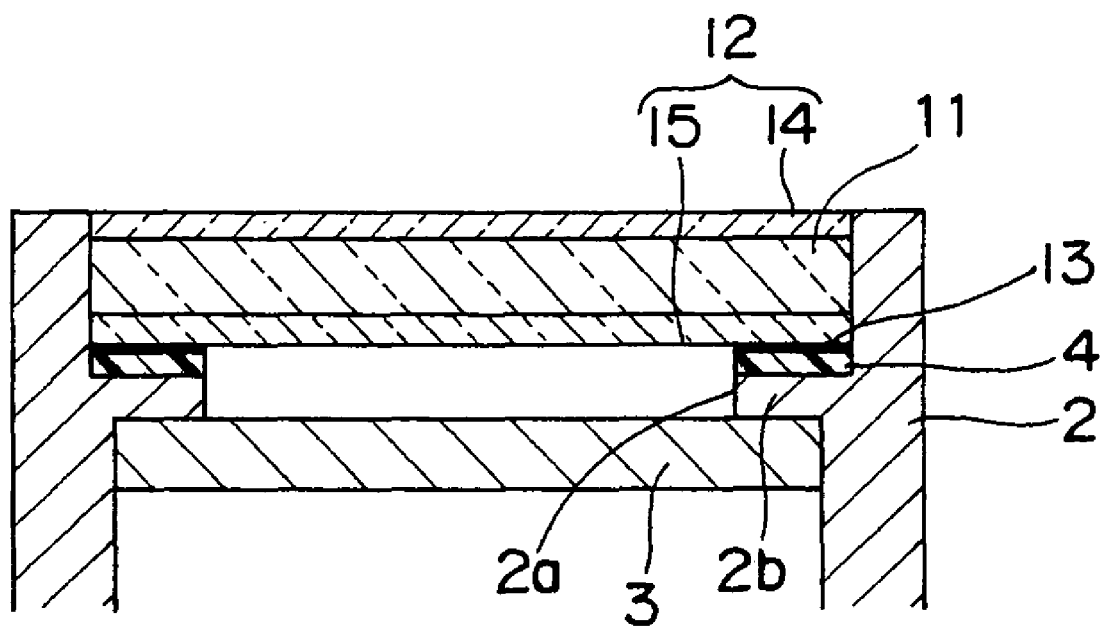
FIG. 4 is a cross-sectional view which shows another structure of the design panel according to the first embodiment of the present invention.
Figure 5:
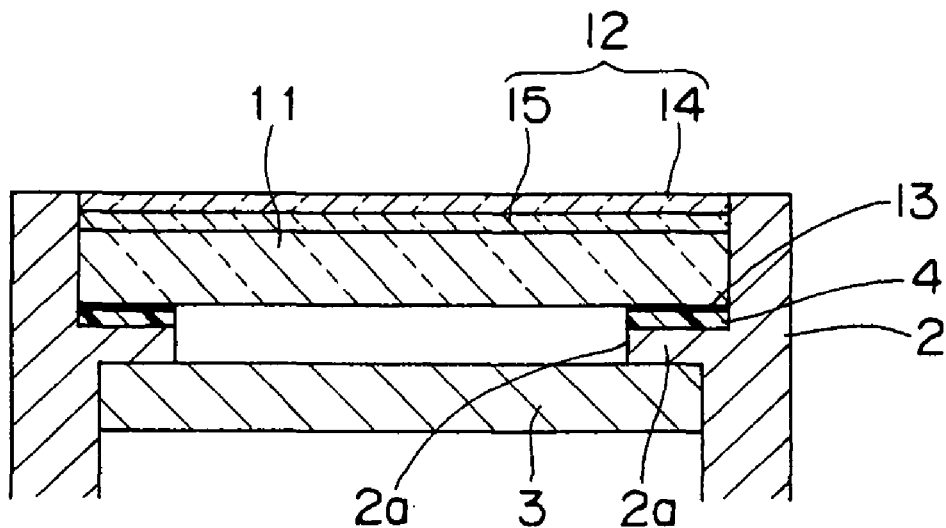
FIG. 5 is a cross-sectional view which shows yet another structure of the design panel according to the first embodiment of the present invention.

Alternatively, as shown in FIG. 4, the concealing section 12 may have a structure in which the transparent support substrate 11 is interposed between the polarizing film 14 and the ¼ wavelength phase difference film 15. Alternatively, as shown in FIG. 5, the concealing section 12 may have a structure in which the polarizing film 14 and the ¼ wavelength phase difference film 15 are positioned on the outside of the transparent support substrate 11. In this case, the transparent support substrate 11 needs to have optical isotropy.

Although not shown in the drawings, the polarizing film 14 generally has a three-layer structure in which a stained polyvinyl alcohol (PVA) layer is interposed between triacetyl cellulose (TAC) layers supporting the both sides of the polyvinyl alcohol layer. The polarizing film 14 preferably has optical properties such as a single piece transmittance of 40% or higher and a degree of polarization of 99% or higher.

The ¼ wavelength phase difference film 15 has a phase difference value of 137 nm corresponding to a quarter wavelength of 550 nm at which human visibility is highest. The ¼ wavelength phase difference film 15 to be used in the present invention can be obtained by drawing a film made of polycarbonate (PC), polyarylate (PAR), "ARTON" (which is a norbornene-based resin manufactured by JSR Corporation), or "ZEONOR" (manufactured by ZEON Corporation) under predetermined drawing conditions so as to have a desired phase difference value.

Figure 6:
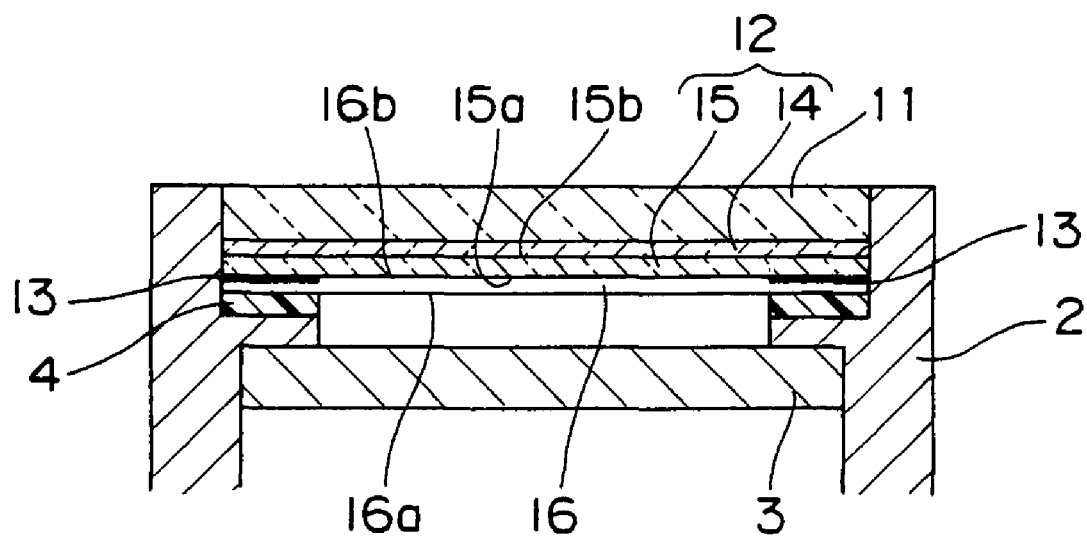
FIG. 6 is a cross-sectional view which shows yet another structure of the design panel according to the first embodiment of the present invention.

The black-colored section 13 can be formed by, for example, directly printing with black ink on the ¼ wavelength phase difference film 15 so as to be fit the shape of the frame portion 2b surrounding the opening 2a of the casing 2. Alternatively, as shown in FIG. 6, the black-colored section 13 may be formed by printing with black ink on another base film 16. Although, in FIG. 6, the another base film 16 is attached to a lower surface 15a of the ¼ wavelength phase difference film 15, it may alternatively be attached to an entire upper surface 15b of the ¼ wavelength phase difference film 15 with a pressure-sensitive adhesive. Further, the black-colored section 13 shown in FIG. 6 is printed on the upper surface 16b of the another base film 16, but may alternatively be printed on the lower surface 16a. Namely, the black-colored section 13 shall be provided so as to be nearer to the display device 3 than the polarizing film 14, that is, so as to be nearer to the side where the design panel 1 is attached to the casing 2 than the polarizing film 14.

Preferred examples of the another base film 16 include a polycarbonate (PC) film, an acrylic film, a polyarylate (PAR) film, a film made of "ARTON" (which is a norbornene-based resin manufactured by JSR Corporation), and a film made of "ZEONOR" (manufactured by ZEON Corporation). The print layer is preferably formed using colored ink containing, as a binder, a resin such as polyvinyl chloride-based resin, polyamide-based resin, polyester-based resin, polyacrylic resin, polyurethane-based resin, polyvinyl acetal-based resin, polyester urethane-based resin, cellulose ester-based resin, or alkyd resin, and as a coloring agent, a black pigment. The print layer is preferably formed by a conventional printing method such as offset lithography, gravure printing, screen printing, or ink-jet printing.

Alternatively, the black-colored section 13 may be integrally formed with the double-sided pressure-sensitive adhesive tape 4. Namely, the double-sided pressure-sensitive adhesive tape 4 may be formed as a black double-sided pressure-sensitive adhesive tape. Such a black double-sided pressure-sensitive adhesive tape can be formed by applying an acrylic-based pressure-sensitive adhesive mixed with a black pigment onto the both surfaces of a black film as a core material (e.g., a polyethylene terephthalate film in which a black pigment is dispersed) and stamping the thus obtained tape into the shape of the frame portion 2b.

Figure 7:
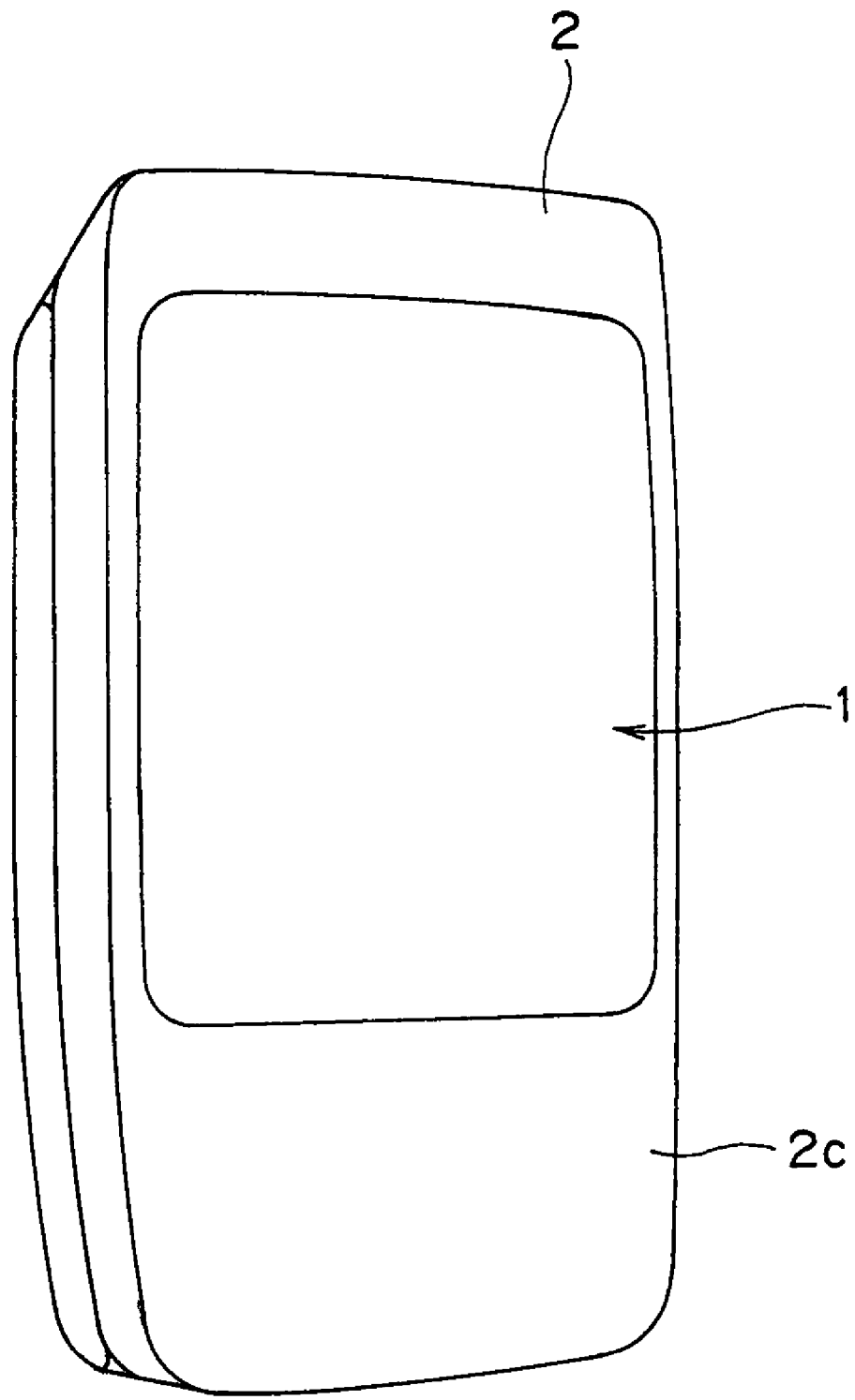
FIG. 7 is an illustration which shows the mobile phone using the design panel according to the first embodiment of the present invention, whose display device is in a standby state.
Figure 8:
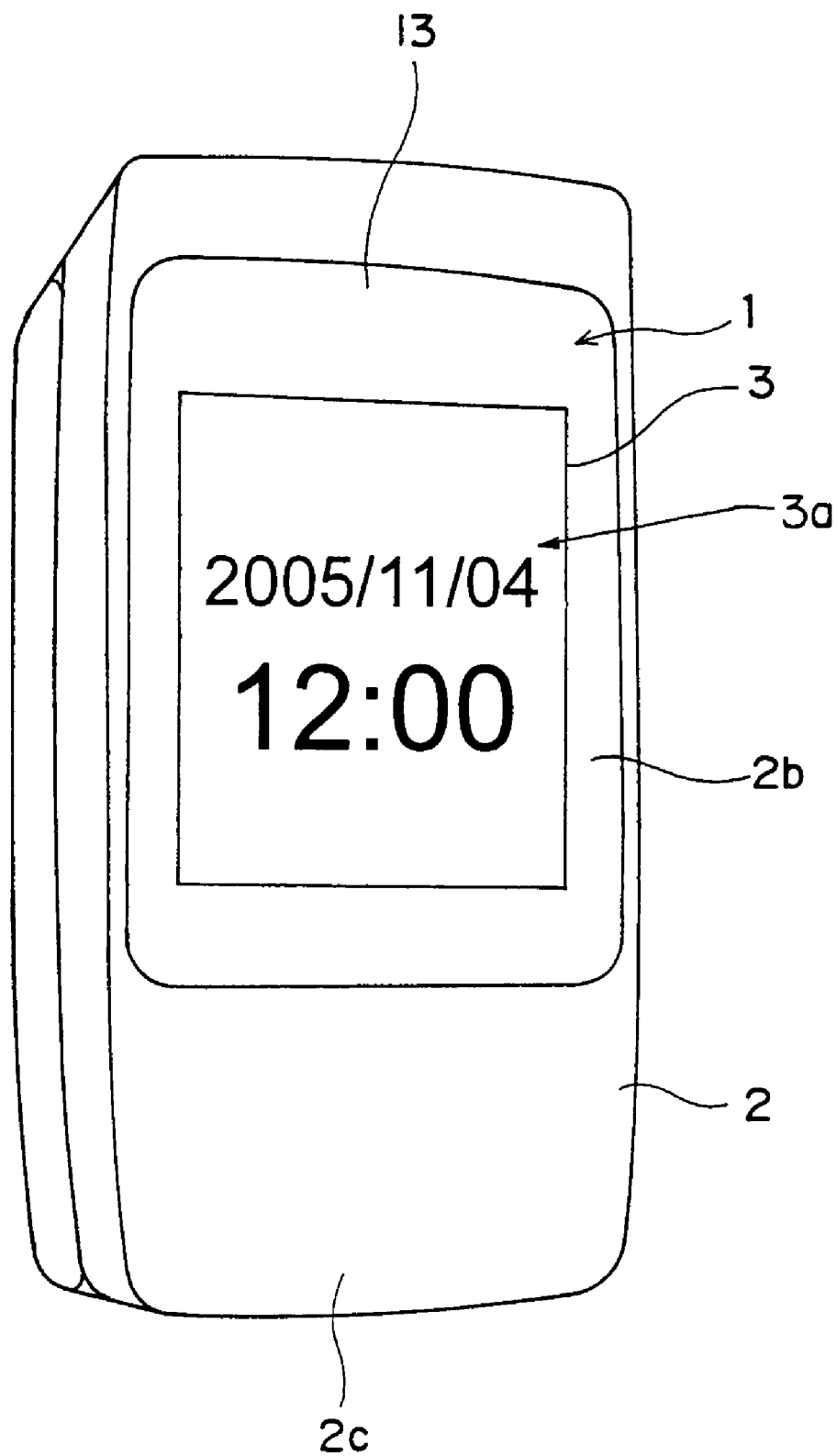
FIG. 8 is an illustration which shows the mobile phone using the design panel according to the first embodiment of the present invention, whose display device is in an information display state.

In a case where the design panel 1 according to the first embodiment of the present invention is used, the display surface 3a of the display device 3 can be made black when the display device 3 is in a standby state, and the frame portion 2b surrounding the display surface 3a is also colored black by the black-colored section 13. Therefore, as shown in FIG. 7, the display surface 3a and the frame portion 2b look like one black window to a user (observer), that is, the user cannot make a distinction between the display surface 3a and the frame portion 2b. Namely, the design panel 1 can conceal the presence of the display device 3 provided under the design panel 1 when the display device 3 is in a standby state because the design panel 1 looks like a solid black window to the user. On the other hand, as shown in FIG. 8, when the display device 3 lights up, the display device 3 becomes visible from the exterior of the casing 2, and therefore the user feels that visual images pop up on the display surface 3a of the display device 3, which is effective from the viewpoint of improving the design of the electronic equipment.

Further, a ¼ wavelength phase difference plate to give a phase advance of ¼ wavelength is preferably attached to the upper surface of the upper polarizing plate 40 of the display device 3. By doing so, it is possible to prevent the absorption of light emitted from the light source 31 when the light is converted into a linearly polarized light by the polarizing plate 40 and therefore to display bright visual images on the display surface 3a.

Hereinbelow, in order to examine the effect obtained by using the design panel 1 according to the first embodiment of the present invention, a comparative evaluation was made on the following design panels according to First and Second Working Examples and Comparative Example.

First Working Example

A design panel according to First Working Example had a structure shown in FIG. 3B. A transparent support substrate was prepared by dip-coating the both surfaces of a methacrylate (PMMA) plate having a thickness of 1 mm with an epoxyacrylate-based polyfunctional acrylate UV curable resin so that the thickness of the resin was 5 µm. A polarizing film had optical properties such as a degree of polarization of 99.5% and a single piece transmittance of 43%, and was attached to the entire lower surface of the transparent support substrate with a transparent acrylic-based pressure-sensitive adhesive so as to have an absorption axis that was the same as the absorption axis (45°) of an upper polarizing plate of a display device. A ¼ wavelength phase difference film was attached to the entire lower surface of the polarizing film with a transparent acrylic-based pressure-sensitive adhesive so that the absorption axis thereof formed 45° with the absorption axis of the polarizing film. A black-colored section was printed with black ink on the lower surface of the phase difference film by ink-jet printing so as to fit the shape of a frame portion of the display device.

Second Working Example

A design panel according to Second Working Example had a structure shown in FIG. 6. A transparent support substrate was prepared by dip-coating the both surfaces of a polycarbonate (PC) plate having a thickness of 0.7 mm with an urethaneacrylate-based polyfunctional acrylate UV curable resin so that the thickness of the resin was 3 µm. A polarizing film had optical properties such as a degree of polarization of 99.5% and a single piece transmittance of 43%, and was attached to the entire lower surface of the transparent support substrate with a transparent acrylic-based pressure-sensitive adhesive so as to have an absorption axis that was the same as the absorption axis (135°) of an upper polarizing plate of a display device. A black-colored section was formed by printing the shape of a frame portion of the display device with black ink by gravure printing on an optically isotropic polycarbonate film having a thickness of 100 µm and attaching the film to the entire lower surface of the polarizing film with a transparent acrylic-based pressure-sensitive adhesive. A ¼ wavelength phase difference film was attached to the entire lower surface of the film with a transparent acrylic-based pressure-sensitive adhesive so that the absorption axis thereof formed 45° with the absorption axis of the polarizing film.

Comparative Example

A design panel according to Comparative Example had a structure shown in FIG. 1B. The design panel was a blackish smoked panel prepared by dispersing a black pigment in a methacrylate (PMMA) panel having a thickness of 1 mm.

<<Evaluation>>

When the display device was in a standby state, the performance of the design panel was evaluated by examining whether the display surface of the display device and the frame portion were distinguishable or not.

When the display device was in an information display state, the performance of the design panel was evaluated by examining whether the display device was visible or not.

TABLE 1

|  | Standby State | Information Display State |
| --- | --- | --- |
| First Working Example | Indistinguishable | ○ |
| Second Working Example | Indistinguishable | ○ |
| Comparative Example | Distinguishable | x |

As described above, according to the first embodiment of the present invention, it is possible to provide the design panel through which the display surface of the display device is visible from the exterior when the display device is in information display state but is invisible when the display device is in the standby state.

Second Embodiment

Figure 9A:
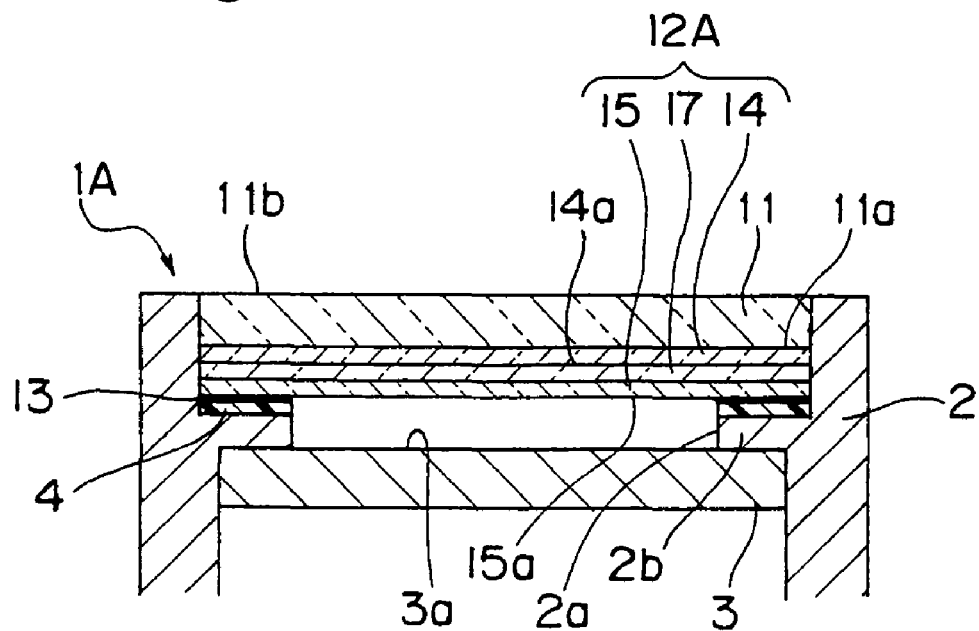
FIG. 9A is a partially enlarged cross-sectional view of a mobile phone using a design panel according to a second embodiment of the present invention.
Figure 9B:
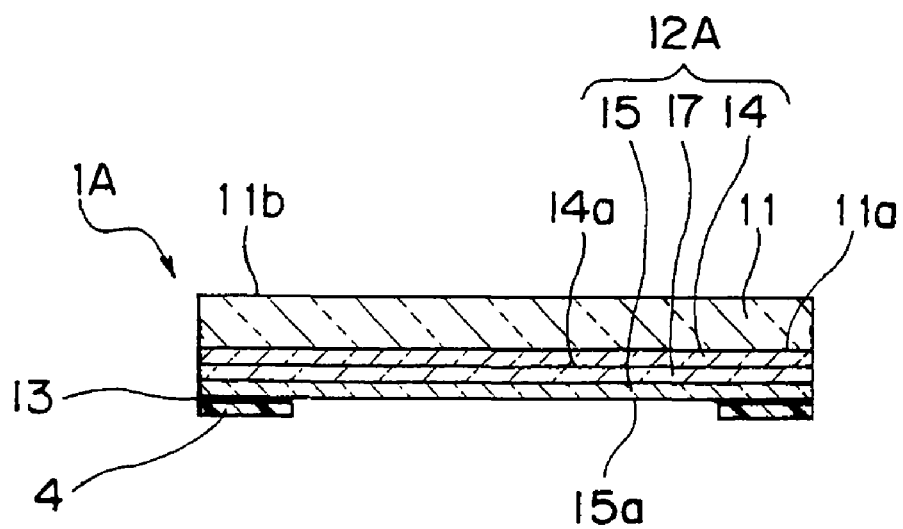
FIG. 9B is a cross-sectional view which shows the structure of the design panel according to the second embodiment of the present invention.

Hereinbelow, a design panel 1A according to a second embodiment of the present invention will be described. FIG. 9A is a partially enlarged cross-sectional view of a mobile phone using a design panel 1A according to the second embodiment of the present invention, and FIG. 9B is a cross-sectional view which shows the structure of the design panel 1A according to the second embodiment of the present invention. As shown in FIGS. 9A and 9B, the design panel 1A according to the second embodiment of the present invention is the same as the design panel 1 according to the first embodiment of the present invention except that the design panel 1A includes, instead of the concealing section 12, a concealing section 12A having a polarizing plate 14, a ¼ wavelength phase difference film 15, and a ½ wavelength phase difference film 17 interposed between the polarizing plate 14 and the ¼ wavelength phase difference film 15.

Figure 10B:
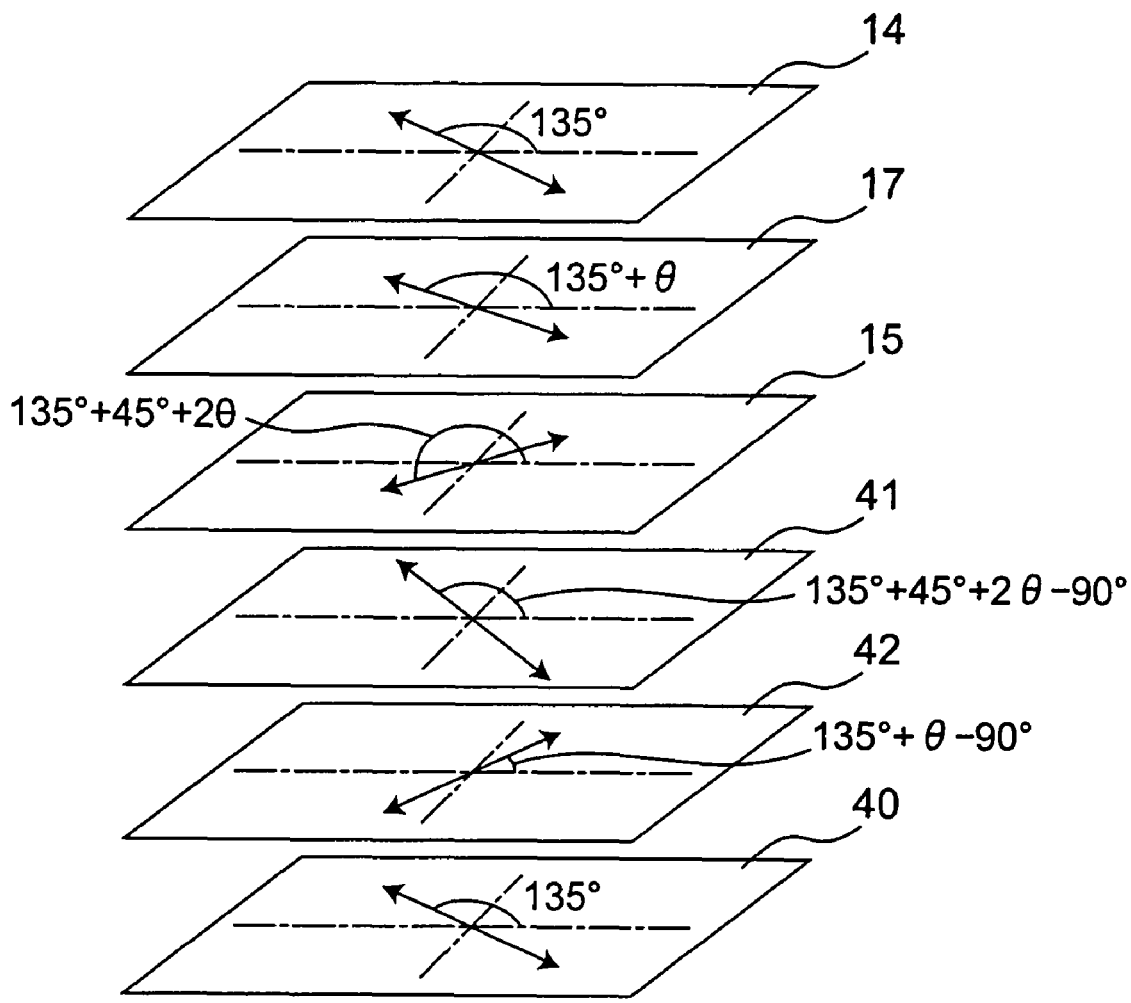
FIG. 10B is an exploded perspective view which schematically shows the positional relationship of polarization directions between a polarizing plate, a ½ wavelength phase difference film, and a ¼ wavelength phase difference film of the design panel according to the second embodiment of the present invention, and an upper polarizing plate of a display device.

In the second embodiment, as shown in FIG. 10B, the ½ wavelength phase difference film 17 of the concealing section 12A is arranged so that the optical axis thereof forms θ° (e.g., 17.5°) with the absorption axis of the polarizing film 14 (in FIG. 10B, the polarizing film 14 of the concealing section 12A has an absorption axis inclined by 135° and an upper polarizing plate 40 of a display device 3 has an absorption axis inclined by 135°). The ½ wavelength phase difference film 17 has a phase difference value of 275 nm corresponding to a half wavelength of 550 nm at which human visibility is highest. The ½ wavelength phase difference film 17 to be used in the present invention can be obtained by drawing a film made of polycarbonate (PC), polyarylate (PAR), "ARTON" (which is a norbornene-based resin manufactured by JSR Corporation), or "ZEONOR" (manufactured by ZEON Corporation) under predetermined drawing conditions so as to have a desired phase difference value.

In the second embodiment, the ¼ wavelength phase difference film 15 is arranged so that the optical axis thereof forms 2θ+45° with the absorption axis of the polarizing film 14. In the second embodiment, the ½ wavelength phase difference film 17 and the ¼ wavelength phase difference film 15 are used together to provide a wide band phase difference plate. As will be described later, such a wide band phase difference plate can keep the reflectivity of light having a short wavelength and the reflectivity of light having a long wavelength at uniformly low levels.

It is to be noted that the polarizing film 14 of the concealing section 12A is preferably arranged so as to have an absorption axis that is the same as that of the upper polarizing plate 40 of the display device 3. By doing so, it is possible to transmit a larger amount of light emitted from a light source 31 of the display device 3 at information display of the display device 3, thereby improving the design of the electronic equipment. For this reason, as shown in FIG. 10B, the display device 3 also preferably has, for example, a ¼ wavelength phase difference film 41 and a ½ wavelength phase difference film 42. In this case, the ¼ wavelength phase difference film 41 is arranged so that the optical axis thereof forms 2θ+45°±90° with the absorption axis of the polarizing film 14 of the concealing section 12A, and the ½ wavelength phase difference film 42 is arranged so that the optical axis thereof forms θ±90° with the absorption axis of the polarizing film 14 of the concealing section 12A.

Figure 11:
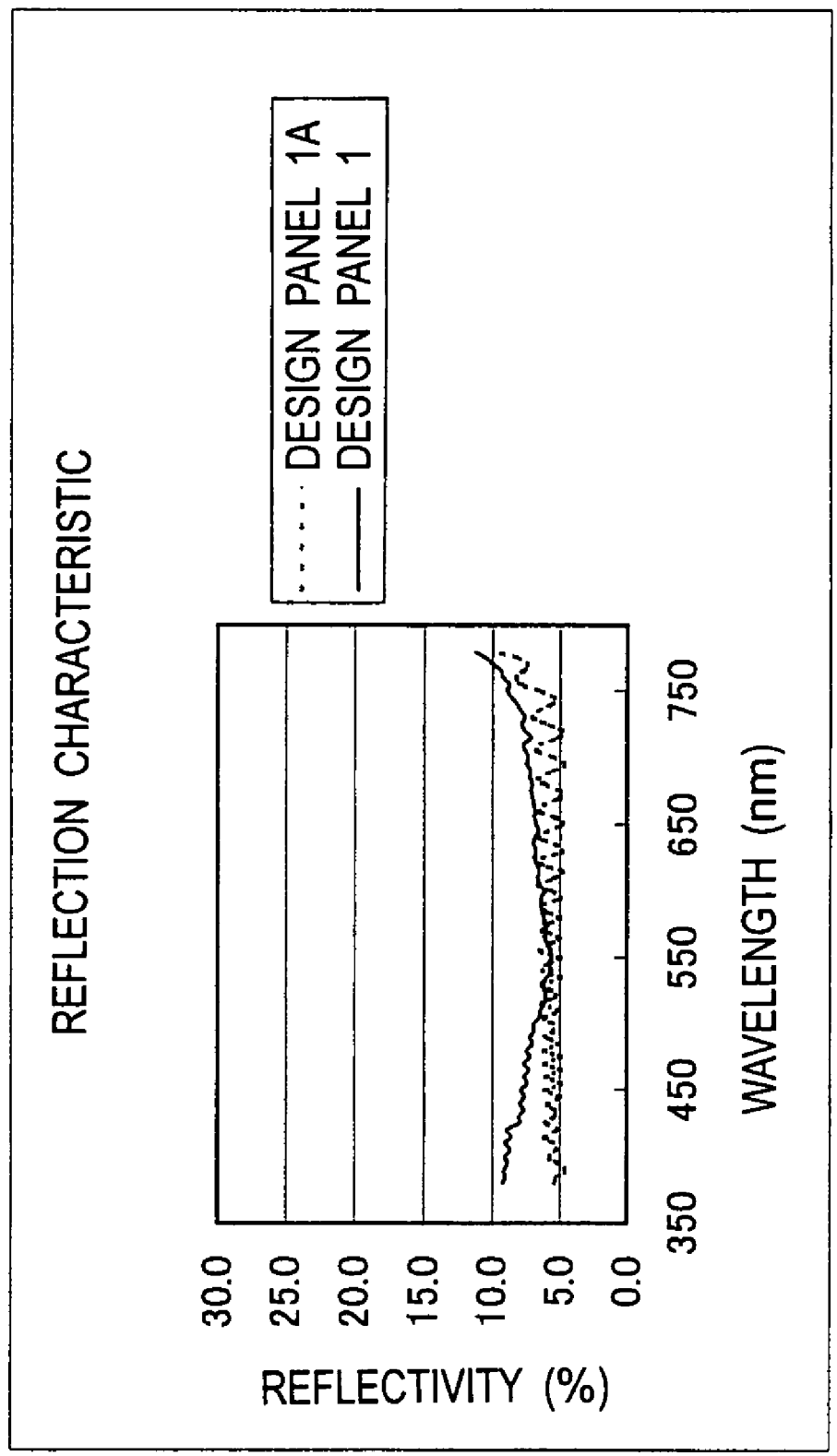
FIG. 11 is a graph which shows the light reflection characteristic of the design panel according to the first embodiment of the present invention and the light reflection characteristic the design panel according to the second embodiment of the present invention.

FIG. 11 is a graph which shows the light reflection characteristic of the design panel 1 according to the first embodiment of the present invention and the light reflection characteristic of the design panel 1A according to the second embodiment of the present invention. In this graph shown in FIG. 11, a solid line denotes the light reflection characteristic of the design panel 1 according to the first embodiment of the present invention, and a dotted line denotes the light reflection characteristic of the design panel 1A according to the second embodiment of the present invention.

As shown in FIG. 11, the design panel 1 according to the first embodiment of the present invention exhibits a particularly low reflectivity to light having a wavelength around 550 nm, at which human visibility is highest, by virtue of the concealing section 12. Therefore, a user does not perceive the presence of the display device 3 provided under the design panel 1 at standby of the display device 3 because the design panel 1 looks like a solid black window to human eyes, thereby improving the design of the electronic equipment. However, the design panel 1 according to the first embodiment of the present invention exhibits a high reflectivity to light having a short wavelength around 400 nm and light having a long wavelength around 750 nm, and therefore part of light having a short wavelength and light having a long wavelength passes through the design panel 1 so that the design panel looks slightly purplish.

On the other hand, as shown in FIG. 11, the design panel 1A according to the second embodiment of the present invention having the structure described above exhibits a uniformly lower reflectivity to light range of from a short wavelength around 400 nm to a long wavelength around 750 nm than the design panel 1 according to the first embodiment of the present invention.

Therefore, by using the design panel 1A according to the second embodiment of the present invention, it is possible to further reduce the amount of light having a short wavelength and the amount of light having a long wavelength passing through the design panel 1A. This makes the design panel 1A look like a deeper black window, thereby improving the design.

Figure 12:
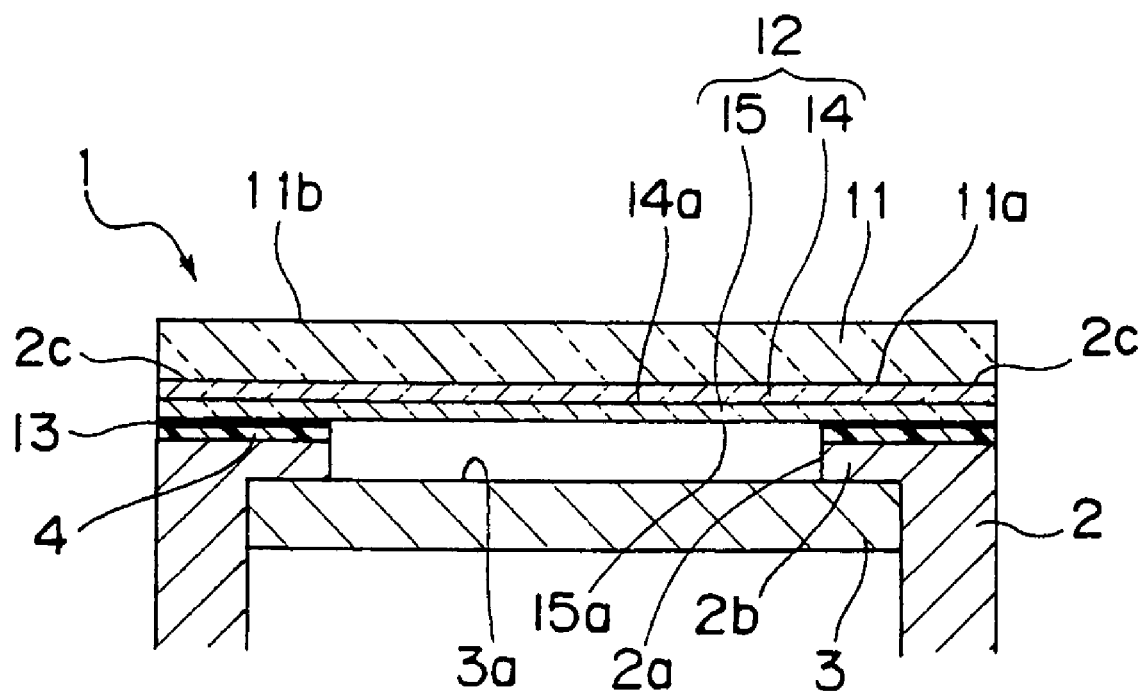
FIG. 12 is a partially enlarged cross-sectional view of a mobile phone using a design panel according to a modification of the present invention.

It is to be noted that the present invention is not limited to the above embodiments, and various modifications are possible. For example, in the above embodiment, the design panel 1 is provided so as to cover the opening 2a partially formed in the casing 2, but alternatively, as shown in FIG. 12, the design panel 1 may be provided so as to cover the entire upper surface 2c of the casing 2 where the opening 2a is formed.

Further, the design panel 1 shown in the drawings has a substantially rectangular shape, but the shape of the design panel 1 is not limited thereto. For example, the design panel 1 may have a triangular, circular, or star shape.

It is to be noted that, by properly combining the arbitrary embodiments of the aforementioned various embodiments, the effects possessed by them can be produced.

INDUSTRIAL APPLICABILITY

The design panel according to the present invention is useful as a design panel to be used for electronic equipments equipped with a display device, such as mobile phones and smart phones, to make a display surface of the display device visible from the exterior at information display of the display device, but to make it invisible at standby of the display device.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The disclosure of Japanese Patent Application No. 2005-323479 filed on Nov. 8, 2005 including specification, drawing and claims are incorporated herein by reference in its entirety.

The invention claimed is:

1. A design panel attached to a casing for an electronic equipment, which is constructed so that a display device whose display surface goes black at standby is placeable inside the casing, and which is formed with an opening that makes the display surface of the display device visible from an outside thereof, the design panel being attached to the casing from the outside for entirely covering the opening, the design panel comprising:
    a transparent support substrate which is externally attachable to the opening and has a larger area than the opening;
    a polarizing film provided outside or inside of the transparent support substrate to convert incident light into a linearly polarized light;
    a ¼ wavelength phase difference film provided on a closer side to an attachment side of the casing with respect to the polarizing film to convert the linearly polarized light into a circularly polarized light; and
    a black-colored section provided on the closer side to the attachment side of the casing with respect to the transparent support substrate, for blacking a portion which is able to be in contact with the casing,
    wherein the polarizing film and the ¼ wavelength phase difference film provide a concealing section, and wherein the display device is made visible from the outside through the concealing section at information display, whereas the display device is made invisible from the outside through the concealing section at standby.

2. The design panel according to claim 1, wherein in a case where the display device is a liquid crystal display device having a polarizing plate, the polarizing film is placeable to have an absorption axis that is the same as that of the polarizing plate.

3. The design panel according to claim 1, wherein the polarizing film is provided to be adjacent to an inside surface of the transparent support substrate.

4. The design panel according to claim 1, wherein the black-colored section is provided on the closer side to the attachment side of the casing with respect to the polarizing film.

5. The design panel according to claim 4, wherein the black-colored section is a layer printed on the ¼ wavelength phase difference film.

6. The design panel according to claim 4, wherein the black-colored section comprises a black double-sided pressure-sensitive adhesive tape with which the transparent support substrate or the ¼ wavelength phase difference film adjacent to an outside surface of the black-colored section, and the casing are able to be adhered together.

7. The design panel according to claim 3, wherein the black-colored section comprises a film member provided to be adjacent to an outside surface or an inside surface of the ¼ wavelength phase difference film.

8. The design panel according to claim 1, whose outermost surface is able to be flush with an outer surface of the casing where the opening is formed.

9. The design panel according to claim 1, wherein the concealing section further comprises a ½ wavelength phase difference film provided between the polarizing film and the ¼ wavelength phase difference film.

10. The design panel according to claim 1, wherein the polarizing film is provided to be adjacent to the inside surface of the transparent support substrate, and wherein the concealing section further comprises a ½ wavelength phase difference film provided between the polarizing film and the ¼ wavelength phase difference film.

* * * * *